United States Patent
Mihara

(10) Patent No.: US 10,422,993 B2
(45) Date of Patent: Sep. 24, 2019

(54) IMAGE DISPLAY DEVICE AND PROGRAM

(71) Applicant: BANDAI CO., LTD., Tokyo (JP)

(72) Inventor: Hyuma Mihara, Tokyo (JP)

(73) Assignee: BANDAI CO., LTD., Tokyo (JP)

( * ) Notice: Subject to any disclaimer, the term of this patent is extended or adjusted under 35 U.S.C. 154(b) by 0 days.

(21) Appl. No.: 15/719,864

(22) Filed: Sep. 29, 2017

(65) Prior Publication Data

US 2018/0024364 A1 Jan. 25, 2018

Related U.S. Application Data

(63) Continuation of application No. 14/984,475, filed on Dec. 30, 2015, now Pat. No. 9,804,391, which is a continuation of application No. 14/206,614, filed on Mar. 12, 2014, now Pat. No. 9,256,070.

(30) Foreign Application Priority Data

| Aug. 1, 2013 | (JP) | 2013-160830 |
| Nov. 5, 2013 | (JP) | 2013-229839 |
| Nov. 5, 2013 | (JP) | 2013-229840 |

(51) Int. Cl.
| G02B 27/01 | (2006.01) |
| A63H 33/22 | (2006.01) |
| G02B 27/02 | (2006.01) |
| G02B 27/14 | (2006.01) |
| H04M 1/02 | (2006.01) |

(52) U.S. Cl.
CPC ......... *G02B 27/0149* (2013.01); *A63H 33/22* (2013.01); *G02B 27/022* (2013.01); *G02B 27/14* (2013.01); *G02B 27/144* (2013.01); *G02B 2027/0161* (2013.01); *H04M 1/0202* (2013.01); *H04M 1/0266* (2013.01)

(58) Field of Classification Search
CPC .. G02B 27/0149; G02B 27/144; G02B 27/14; G02B 27/022; G02B 2027/0161; H04M 1/0266; H04M 1/0202; A63H 33/22
USPC .......................................... 359/458, 462, 630
See application file for complete search history.

(56) References Cited

U.S. PATENT DOCUMENTS

| 2,840,228 | A | 6/1958 | Takacs |
| 6,481,851 | B1 | 11/2002 | McNelley et al. |
| 8,125,583 | B2 | 2/2012 | Hayashi et al. |

FOREIGN PATENT DOCUMENTS

| GB | 2459971 A | 11/2009 |
| JP | 60-21715 U | 2/1985 |
| JP | H08-122695 A | 5/1996 |
| JP | 2000-098290 A | 4/2000 |
| JP | 2004-101197 A | 4/2004 |

(Continued)

OTHER PUBLICATIONS

European Search Report dated Oct. 13, 2014.

*Primary Examiner* — Tuyen Tra
(74) *Attorney, Agent, or Firm* — Rabin & Berdo, P.C.

(57) ABSTRACT

An image display device includes a transparent plate which may be disposed in an inclined manner with respect to a display section of a portable terminal provided with the display section. A display displayed on the display section may be reflected on the transparent plate. A space behind the transparent plate may be viewed through the transparent plate and, at the same time, an image on the display section of the portable terminal may also be viewed while being reflected on the transparent plate.

9 Claims, 12 Drawing Sheets

(56) References Cited

FOREIGN PATENT DOCUMENTS

| | | |
|---|---|---|
| JP | 2006-158718 A | 6/2006 |
| JP | 2008-155065 A | 7/2008 |
| JP | 2009-069550 A | 4/2009 |
| JP | 2009-136398 A | 6/2009 |
| JP | 2009-192434 A | 8/2009 |
| JP | 2009-200928 A | 9/2009 |
| JP | WO 2015162991 A1 * 10/2015 | ............... G06F 9/00 |
| WO | WO-2012169422 A1 | 12/2012 |
| WO | WO-2014/125546 A1 | 8/2014 |
| WO | WO-2015/129522 A1 | 9/2015 |

* cited by examiner

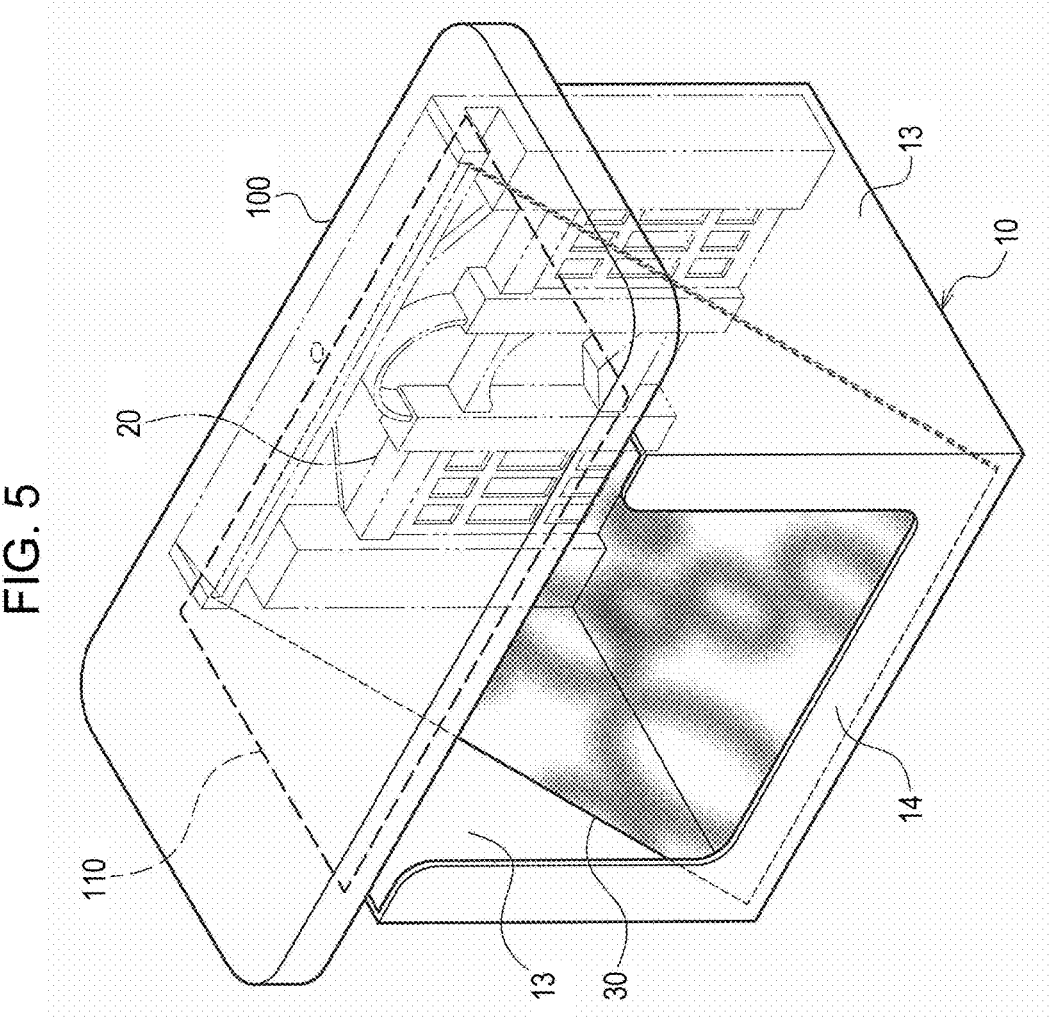

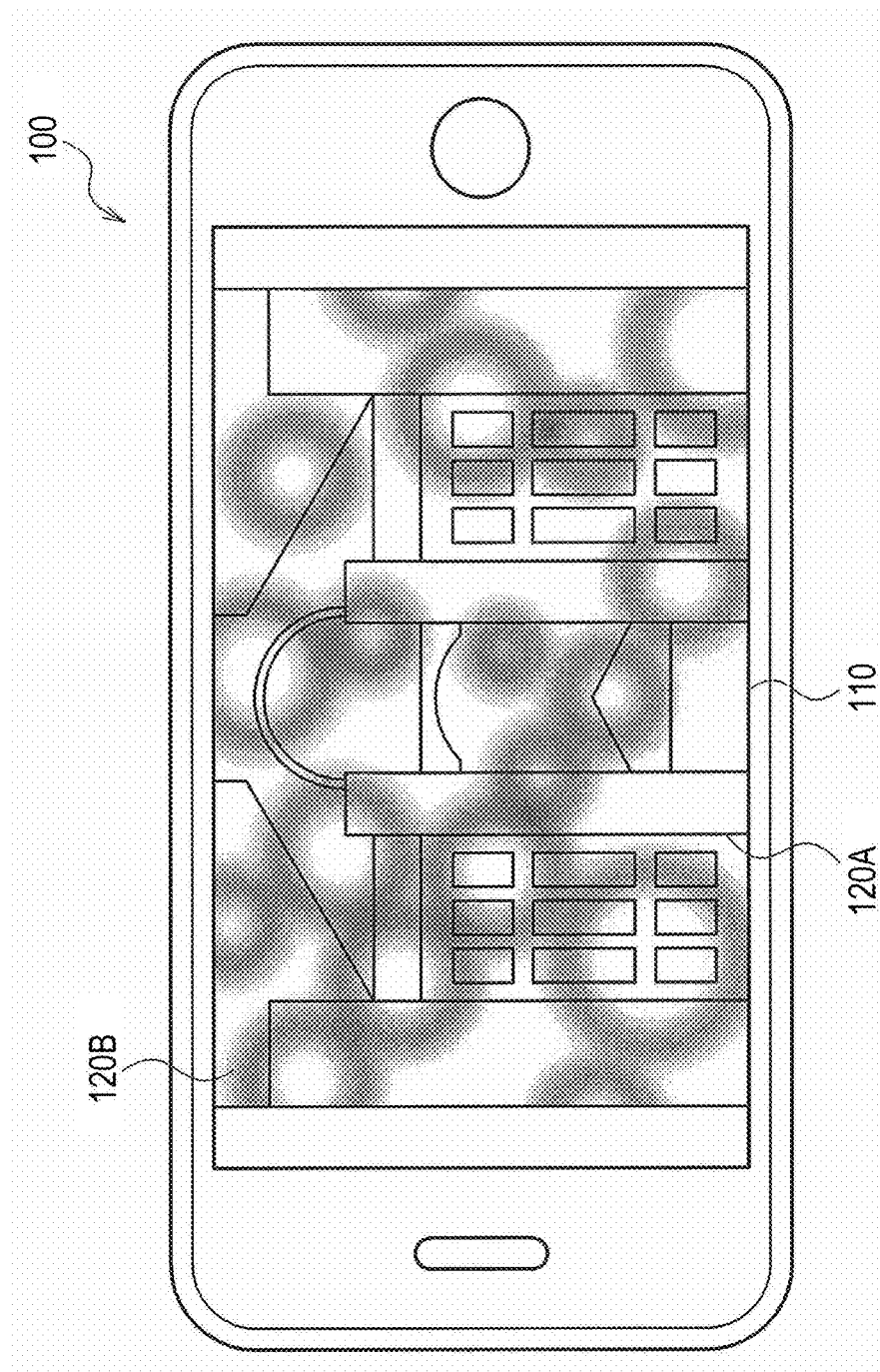

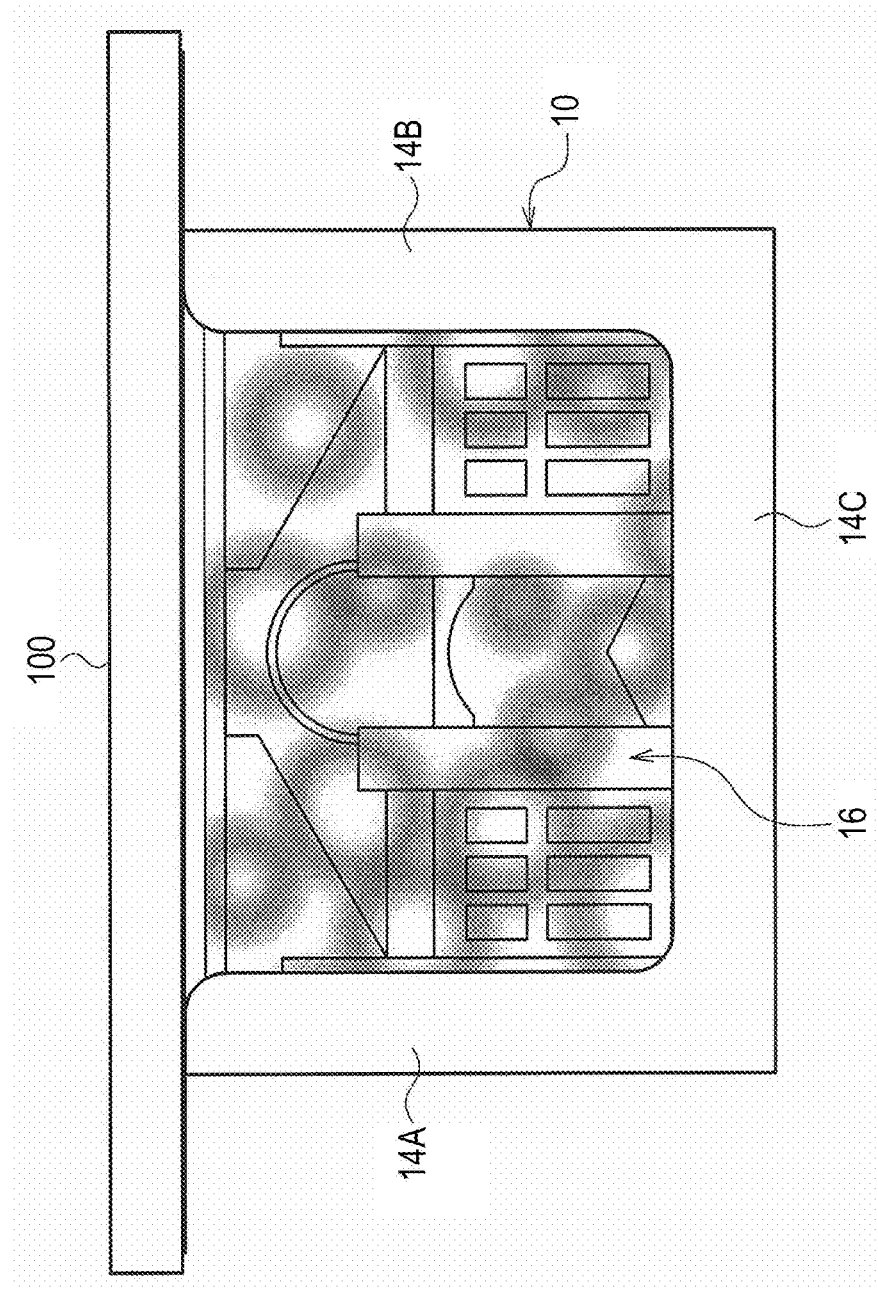

IMAGE DISPLAY DEVICE AND PROGRAM

CROSS REFERENCES TO RELATED APPLICATIONS

The present application is a continuation of U.S. application Ser. No. 14/984,475, filed on Dec. 30, 2015, and allowed on Jul. 10, 2017, which is a continuation of U.S. application Ser. No. 14/206,614, filed on Mar. 12, 2014, and issued on Feb. 9, 2016 as U.S. Pat. No. 9,256,070. The prior US applications and the present continuation application claim the benefit of priority of Japanese Patent Application No. 2013-229839, filed on Nov. 5, 2013, Japanese Patent Application No. 2013-160830, filed on Aug. 1, 2013, and Japanese Patent Application No. 2013-229840, filed on Nov. 5, 2013. The disclosures of these prior U.S. and foreign applications are incorporated herein by reference.

BACKGROUND OF THE INVENTION

1. Field of the Invention

The present invention relates to an image display device and a program.

2. Description of the Related Art

An image display device in which two images are superimposed on each other using a half mirror is proposed (see, for example, Japanese Unexamined Patent Application Publication (JP-A) No. 8-122695). FIG. 4 of JP-A No. 8-122695 illustrates an image device with which a viewer may view a synthesized image obtained by superimposing a background image behind a half mirror and passing through the half mirror and an image reflected on the half mirror on each other.

The half mirror used in the image device of JP-A No. 8-122695 is produced by depositing a metal reflective layer such as a chromium or SUS layer as thin as possible, almost translucent, at least on one side of a glass material. Therefore, the half mirror is relatively expensive.

The half mirror described in JP-A No. 8-122695 has reflectance of 50% and transmittance of 50%. Although these numerical values are examples, transmittance of the background image is typically low in the half mirror because of the existence of the metal reflective layer.

SUMMARY OF THE INVENTION

The present invention provides an image display device and a program capable of displaying an image, such as 3D hologram, at a relatively lower cost without using a half mirror.

An image display device according to the present invention includes a transparent plate having transparency and capable of being disposed in an inclined manner with respect to a display section of a portable terminal provided with the display section, in which a display displayed on the display section is capable of being reflected on the transparent plate. In the image display device according to the present invention, the transparent plate may be made of glass or resin, the resin being polyvinyl chloride, polyethylene terephthalate, polycarbonate, acrylic resin, or the like.

The image display device according to the present invention may further include a support section which is capable of supporting the portable terminal from the display section side.

In the image display device according to the present invention, the transparent plate may be situated below the portable terminal supported by the support section.

The image display device according to the present invention includes an object, in which the transparent plate may be situated further toward a user than the object.

In the image display device according to the present invention, the object may be replaceable.

In the image display device according to the present invention, the object may be stereoscopic.

The image display device according to the present invention may further include a side wall situated on a side of the transparent plate.

In the image display device according to the present invention, a pair of side walls may be disposed on both sides of the transparent plate.

The image display device according to the present invention may further include a front wall situated between the transparent plate and a user.

In the image display device according to the present invention, the front wall may have an opening from which the user is capable of viewing the transparent plate.

In the image display device according to the present invention, the front wall may include a side edge wall which is disposed on a side of the opening and defines an opening width of the opening.

In the image display device according to the present invention, the front wall may include two side edge walls which are disposed on both sides of the opening and define the opening width of the opening.

The image display device according to the present invention may further include a rear wall situated on the opposite side of the user with respect to the transparent plate.

In the image display device according to the present invention, the pair of side walls may be capable of supporting the portable terminal from the display section side.

In the image display device according to the present invention, a pair of side walls may be disposed on both sides of the transparent plate; the pair of side walls may be capable of supporting the portable terminal from the display section side; and the pair of side walls may serve also as the support section.

The image display device according to the present invention may further include a side wall situated on a side of the transparent plate and a front wall situated between the transparent plate and a user, in which the side wall and the front wall may be capable of supporting the portable terminal from the display section side.

The image display device according to the present invention may further include a side wall situated on a side of the transparent plate and a front wall situated between the transparent plate and a user, in which the side wall and the front wall may be capable of supporting the portable terminal from the display section side and in which the side wall and the front wall may serve also as the support section.

In the image display device according to the present invention, the front wall may have an opening from which the user is capable of viewing the transparent plate.

In the image display device according to the present invention, the front wall may include a side edge wall which is disposed on a side of the opening and defines an opening width of the opening.

In the image display device according to the present invention, the front wall may include two side edge walls which are disposed on both sides of the opening and define the opening width of the opening.

The image display device according to the present invention may further includes a side wall situated on a side of the transparent plate and a rear wall situated on the opposite side of a user with respect to the transparent plate, in which the side wall and the rear wall may be capable of supporting the portable terminal from the display section side.

The image display device according to the present invention may further include a side wall situated on a side of the transparent plate and a rear wall situated on the opposite side of a user with respect to the transparent plate, in which the side wall and the rear wall may be capable of supporting the portable terminal from the display section side and in which the side wall and the rear wall may serve also as the support section.

The image display device according to the present invention may further include a front wall situated between the transparent plate and a user and a rear wall which faces the front wall, in which the front wall and the rear wall may be capable of supporting the portable terminal from the display section side.

The image display device according to the present invention may further include a front wall situated between the transparent plate and a user and a rear wall which faces the front wall, in which the front wall and the rear wall may be capable of supporting the portable terminal from the display section side and in which the front wall and the rear wall may serve also as the support section.

In the image display device according to the present invention, the front wall may have an opening from which the user is capable of viewing the transparent plate.

In the image display device according to the present invention, the front wall may include a side edge wall which is disposed on a side of the opening and defines an opening width of the opening.

In the image display device according to the present invention, the front wall may include two side edge walls which are disposed on both sides of the opening and define the opening width of the opening.

The image display device according to the present invention may also include a bottom wall.

The image display device according to the present invention may further include a box body which includes a bottom wall and a pair of side walls disposed on both sides of the transparent plate.

In the image display device according to the present invention, the box body may have a front opening situated between the transparent plate and a user.

In the image display device according to the present invention, the box body may include a side edge wall which is disposed on a side of the front opening and defines an opening width of the front opening.

In the image display device according to the present invention, the box body may include two side edge walls which are disposed on both sides of the front opening and define the opening width of the front opening.

In the image display device according to the present invention, the box body may have an upper opening which faces the bottom wall.

The image display device according to the present invention may further include a placement section which defines an angle of the transparent plate.

In the image display device according to the present invention, the object may include a side stopper which positions the transparent plate in a width direction.

A packaging container according to the present invention includes the image display device and a lid body which covers the upper opening and the front opening of the box body, in which an article may be capable of being contained in a space surrounded by the box body and the lid body.

BRIEF DESCRIPTION OF THE DRAWINGS

FIG. 5 is a perspective view illustrating a usage condition of the image display device;

FIG. 6 is a diagram illustrating an image on a display section of the portable terminal;

FIG. 7 is a diagram illustrating an image displayed in the image display device;

DESCRIPTION OF THE PREFERRED EMBODIMENTS

Figure 1:
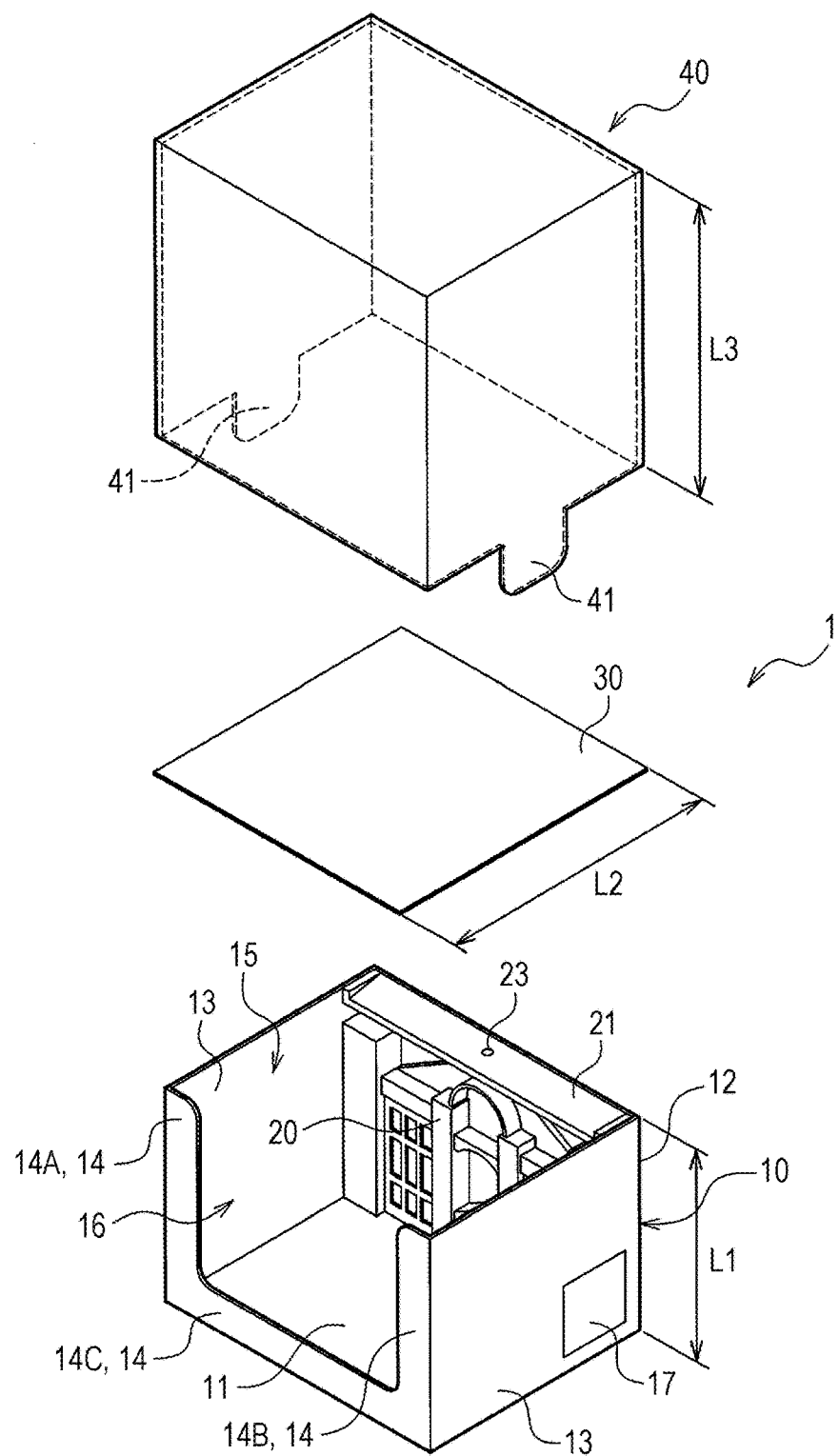
FIG. 1 is a schematic perspective view of a packaging container (including an image display device and a lid body) according to an embodiment of the present invention.

FIG. 1 is a schematic perspective view of a packaging container according to an embodiment of the present invention. As illustrated in FIG. 1, a packaging container 1 includes a box body 10, a stereoscopic object 20, a transparent plate (i.e., a clear card) 30, and a lid body 40. In the box body 10, goods or articles (not illustrated), such as candies and toys, may be contained together with the stereoscopic object 20 and the transparent plate 30, and the box body 10 is covered by the lid body 40 from above. Thus, the box body 10 may be used as the packaging container 1 for various goods.

The box body 10 includes a bottom wall 11 on which the stereoscopic object 20 is placed, a rear wall 12 disposed behind the stereoscopic object 20, and side walls 13 and 13 extending forward from the rear wall 12 at both sides of the stereoscopic object 20. The box body 10 has an upper opening 15 which faces the bottom wall 11, and a front opening 16 which faces the rear wall 12. In a case in which the packaging container 1 is not configured, the bottom wall 11 and the rear wall 12 are unnecessary. In the present embodiment, the box body 10 further includes a front wall 14 which faces the rear wall 12. The front wall 14 includes two side edge walls 14A and 14B disposed at both sides of the front opening 16 to define an opening width of the front opening 16. The front wall 14 may further include a lower edge wall 14C which stands up from the bottom wall 11 to define a lower end of the front opening 16.

A height L1 of the box body 10 is lower than a length L2 of the transparent plate 30 (L1<L2). A height L3 of the lid body 40 is higher than a length L2 of the transparent plate 30 (L1<L2<L3). With this configuration, the transparent plate 30 may be leaned inside the box body 10 and the box body 10 may be covered by the lid body 40 from above. The lid body 40 has, for example, a shape of a lid box body with its lower end open. The lid body 40 includes folding pieces 41 and 41 which are folded and made to adhere to the bottom wall 11 of the box body 10 using an adhesive tape or the like, whereby the lid body 40 is mounted on and fixed to the box body 10.

Figure 2:
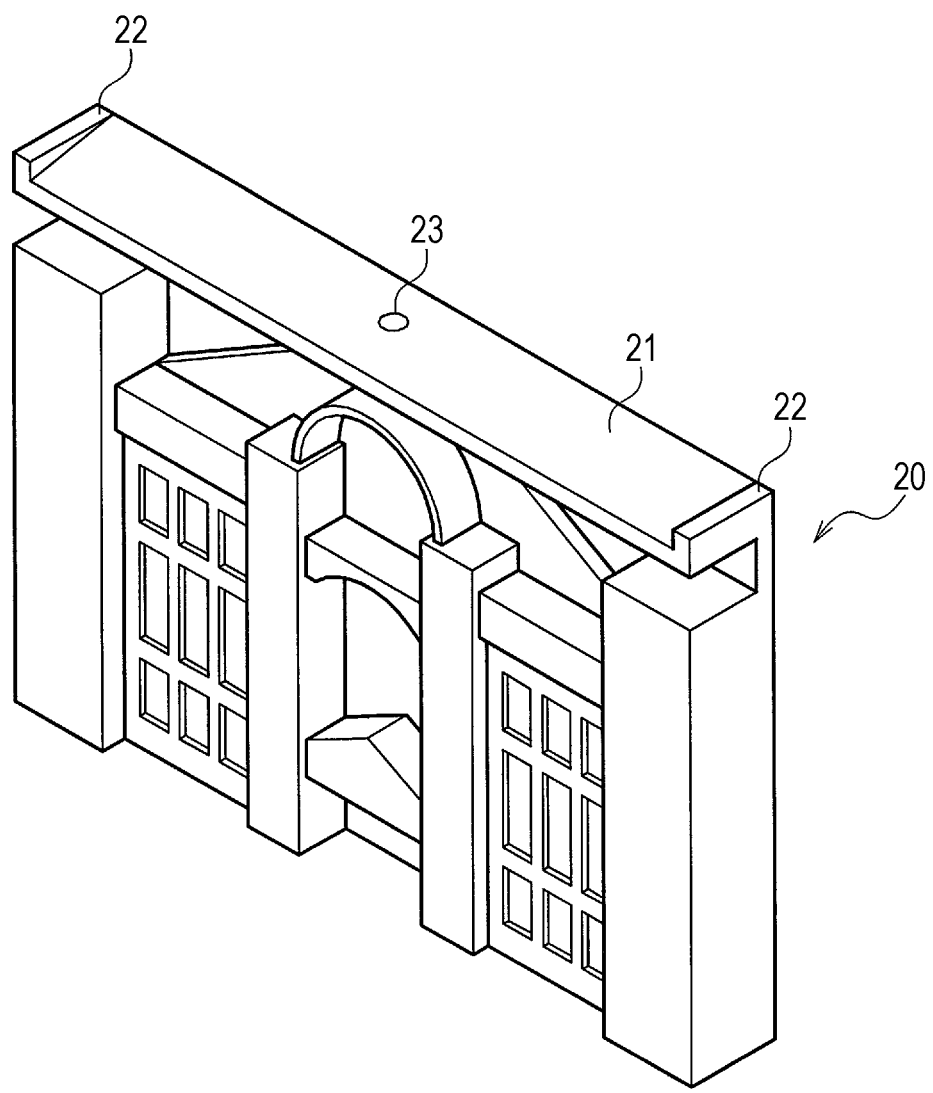
FIG. 2 is a perspective view of a stereoscopic object.

The stereoscopic object 20 includes projections and recesses on the front thereof as illustrated in FIG. 2. The example illustrated in FIG. 2 is a stereoscopic object of a building. The stereoscopic object 20 is not limited to a building but may be various characters and figures. The stereoscopic object 20 may be made of resin or metal, or may be a paper craft. The stereoscopic object 20 may be fixed to the rear wall 12 of the box body 10. Alternatively, the stereoscopic object 20 may be taken out of the packaging container 1 and disposed back to back on the rear wall 12. Although the stereoscopic object 20 is used in the present embodiment, non-stereoscopic objects, such as a card and a wall on which a background is drawn, may also be used. The object may be replaceable. Further, the object and the rear wall 12 may be removed so that actual scenery and an actual building may be viewed through the transparent plate 30. In that case, the image display displayed on the transparent plate 30 may be viewed in a superimposed manner on the actual scenery and the actual building which are viewed through the transparent plate 30.

Figure 3:
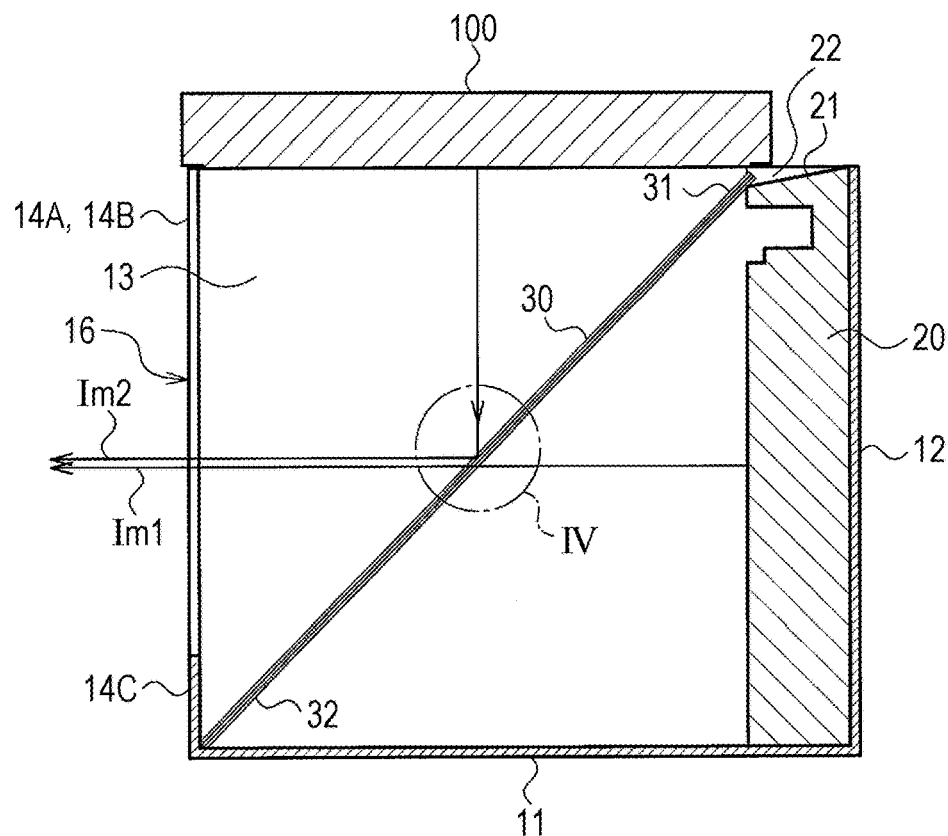
FIG. 3 is a cross-sectional view illustrating a usage condition in which a portable terminal is placed on the image display device.

The transparent plate 30 is formed as a thin plate by a material transparent (i.e., having transparency) to the wavelength bands of visible light, such as glass or resin. The transparent plate 30 is desirably formed by compact of resin, such as polyvinyl chloride (PVC), polyethylene terephthalate (PET), polycarbonate (PC), or acrylic resin, from the standpoint of difficulty in damaging and reduction in weight. Polyethylene terephthalate is desirable from the standpoint of a low production cost. Regarding thickness of the transparent plate 30, equal to or thicker than 0.4 mm is desirable from the standpoint of intensity. The thickness of the transparent plate 30 is desirably equal to or lower than 0.6 mm as a surface on which an image is reflected and on which an image is displayed. As illustrated in FIG. 3, the transparent plate 30 is disposed between the side walls 13 and 13 of the box body 10 and in front of the stereoscopic object 20 such that a lower end portion 32 is situated in front of an upper end portion 31 (for example, angle of inclination=45 degrees). That is, the transparent plate 30 is situated further toward a user than the stereoscopic object 20.

A placement section 21 on which the upper end portion 31 of the transparent plate 30 may be placed is formed on an upper surface of the stereoscopic object 20. The placement section 21 is formed as, for example, an inclined surface inclined downward toward the front. By providing such placement section 21, an angle of the transparent plate 30 is defined such that an image on a display section 110 (see FIG. 5) is superimposed at a surface position of the stereoscopic object 20 viewed through the transparent plate 30, thereby providing a clearer image to a user. In this embodiment, the inclined surface inclined downward toward the front is used as the placement section. However, the position and shape of the placement section are not limited to such an inclined surface as long as positioning in which the image of the display section 110 is superimposed at a surface position of the stereoscopic object 20 viewed through the transparent plate 30 is achieved. For example, a placement section which may fix the upper end portion 31 of the transparent plate 30 may be provided at a front side of the stereoscopic object 20, or a placement section may be provided in the box body. Further, as illustrated in FIGS. 2 and 3, two side stoppers 22 and 22 projecting upward at both ends in the width direction of the placement section 21 may be provided on the upper surface of the stereoscopic object 20. These two side stoppers 22 and 22 may position the transparent plate 30 in the width direction. The side stoppers may be provided in the box body. The lower end portion 32 of the transparent plate 30 is locked at a corner at which the bottom wall 11 and the front wall 14 (14A to 14C) of the box body 10 cross each other as illustrated in FIG. 3.

FIGS. 3 and 5 illustrate a usage condition of an image display device in which a portable terminal (for example, a smartphone) 100 provided with the display section 110 illustrated in FIG. 6 is placed on top of the side walls 13 and 13 of the box body 10 with the display section 110 facing below (i.e., the portable terminal 100 is supported from the side of the display section 110). The image display device is configured by assembling among the members illustrated in FIG. 1 the box body 10, the stereoscopic object 20, and the transparent plate 30, excluding the lid body 40, as illustrated in FIGS. 3 and 5. FIG. 7 illustrates an example of image display viewed from the front opening 16 in the usage condition of the image display device illustrated in FIGS. 3 and 5. As illustrated in FIG. 7, the transparent plate 30 is visible from the front opening 16. In the present embodiment, the portable terminal is supported by the box body and may be supported by at least two wall surface portions among the side walls 13 and 13, the rear wall 12, and the front wall 14. That is, in the present embodiment, at least two wall surfaces supporting the portable terminal 100, i.e., at least two wall surfaces among the side walls 13 and 13, the rear wall 12, and the front wall 14 serve also as a "support section" of the present invention. However, the wall surfaces of the box body do not necessarily serve also as the "support section" and the "support section" of the present invention may be provided separately. It is sufficient that the "support section" which may support the portable terminal 100 from the side of the display section 110 is provided. It is further desirable that, with the support section, the transparent plate 30 is situated below the display section 110 of the portable terminal 100.

In the image display device according to the present embodiment, as illustrated in FIG. 3, an image Im2 of the display section 110 of the portable terminal 100 reflected on the transparent plate 30 is superimposed on a perspective stereoscopic image Im1 of the stereoscopic object 20 entering from behind the transparent plate 30 and viewed through the transparent plate 30. At this time, since the side behind the transparent plate 30 at which the stereoscopic object 20 is disposed is surrounded by the stereoscopic object 20, the side walls 13 and 13, and the portable terminal 100, the side behind the transparent plate 30 is darker than the side of the front opening 16 in front of the transparent plate 30. For a viewer who directly views the stereoscopic object 20 (i.e., the dark side) from the front opening 16 side in front of the transparent plate 30 (i.e., from the light side), the stereoscopic object 20 may be viewed through the transparent plate 30 and, at the same time, the viewer may also view the image Im2 of the display section 110 of the portable terminal 100 that is reflected on the transparent plate 30 (i.e., displayed on the transparent plate 30). That is, the image display device of the present embodiment includes light and dark difference generating means (in the present embodiment, any one of or a combination of the stereoscopic object 20, the side walls 13 and 13, the bottom wall 11, the front wall 14, the rear wall 12, and the portable terminal 100) which may produce via the transparent plate 30 a difference in light and dark between one space (i.e., a space in which the user exists with respect to the transparent plate 30: in front of the transparent plate 30 in the present embodiment) and the other space (i.e., a space on the opposite side of the user with respect to the transparent plate 30: behind the transparent plate 30 in the present embodiment). Accordingly, the user may view the side behind the transparent plate 30 (i.e., the space on the opposite side of the user with respect to the transparent plate 30) through the transparent plate 30 and, at the same time, the user may view the image Im2 of the display section 110 of the portable terminal 100 reflected on the transparent plate 30 (i.e., displayed on the transparent plate 30). This phenomenon on the transparent plate 30 is the same as a phenomenon on a car window at night on which an occupant's face is superimposed on a scene viewed through the car window. Since the transparent plate 30 is disposed in an inclined manner, the transparent plate 30 may reflect and display the image of the display section 110 to the viewer. Thus, according to the image display device of the present embodiment, the image of the display section 110 reflected on the transparent plate 30 may be superimposed on the stereoscopic object 20 viewed through the transparent plate 30 with relatively high transmittance without using a half mirror.

Figure 4:
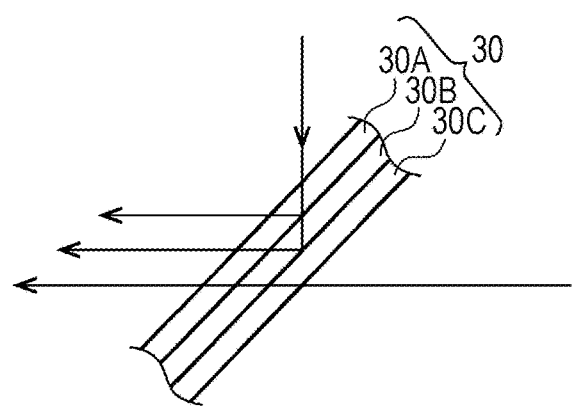
FIG. 4 is an enlarged view of section IV of FIG. 3.
Figure 8A:
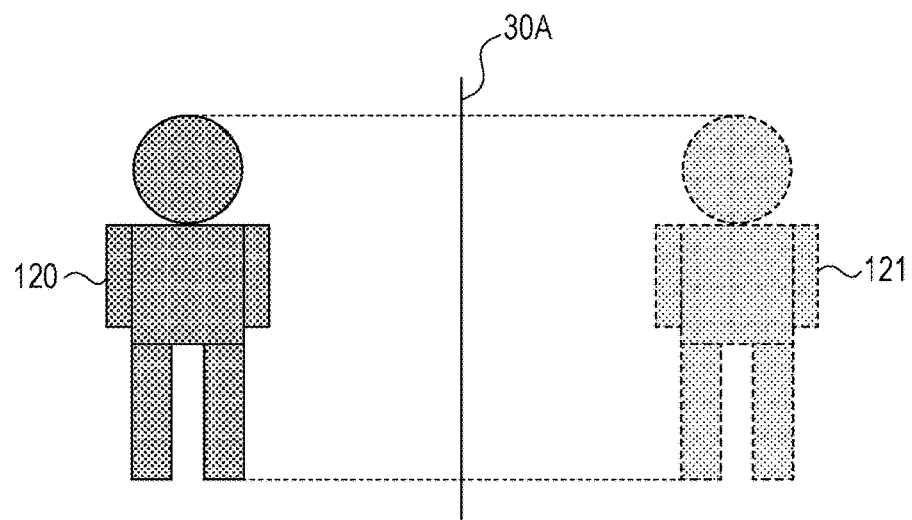
FIG. 8A illustrates a reflected image when a single transparent thin plate is used.
Figure 8B:
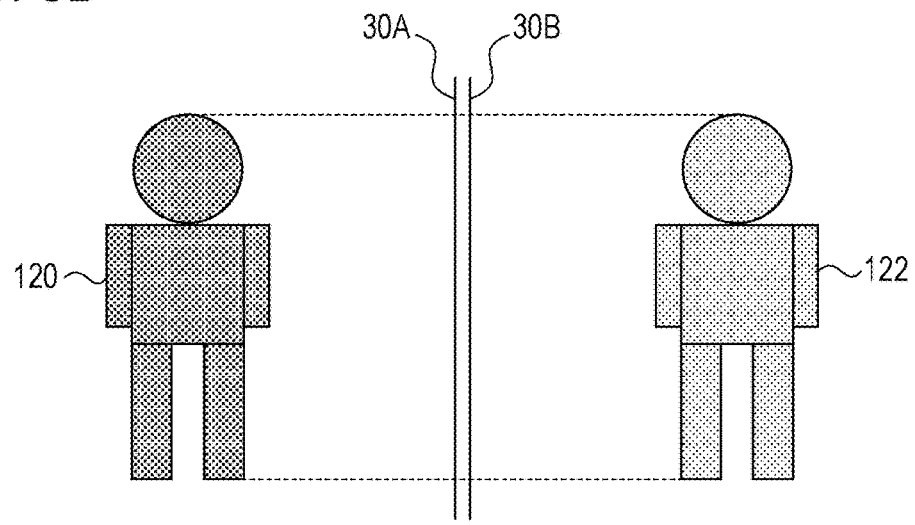
FIG. 8B is a diagram illustrating a reflected image when a plurality of transparent thin plates are used.

As illustrated in FIG. 4 which is an enlarged view of section IV of FIG. 3, the transparent plate 30 may be formed by laminating a plurality of transparent thin plates 30A to 30C. With this configuration, each of interfaces between the plurality of transparent thin plates 30A, 30B, and 30C functions as a reflecting layer and thus reflectance may be increased. Since the transmittance decreases as a result of increased reflectance, the space behind the transparent plate 30 becomes darker and the effect of the above phenomenon via the transparent plate 30 is increased. A reflected image 122 obtained by reflecting an image 120 of the display section 110 on two transparent thin plates 30A and 30B as illustrated in FIG. 8B is clearer than a reflected image 121 obtained by reflecting an image 120 of the display section 110 on a single transparent thin plate 30A as illustrated in FIG. 8A.

Here, a thickness of each of the transparent thin plates 30A to 30C may be equal to or smaller than 0.45 mm. If each of the transparent thin plates 30A to 30C is thicker than 0.45 mm, position misalignment is caused between the reflected images on different interfaces as illustrated in FIG. 4, and blur in a composite reflected image becomes noticeable. If the transparent plate 30 is made of resin, when formability is considered, the thickness of each of the transparent thin plates 30A to 30C may be 0.15 mm to 0.45 mm.

The number of transparent thin plates to be laminated is desirably two to four when the thickness mentioned above is considered; If the number of transparent thin plates to be laminated is greater than four, position misalignment is caused between the reflected images on different interfaces, and blur in a composite reflected image becomes noticeable.

The transparent plate 30 or the plurality of transparent thin plates 30A to 30C may be colored gray or the like. By coloring the transparent plate 30 or the plurality of transparent thin plates 30A to 30C, transmittance of the transparent plate 30 or the plurality of transparent thin plates 30A to 30C may be lowered; and by making the space behind the transparent plate 30 or the plurality of transparent thin plates 30A to 30C darker, reflectance on the transparent plate 30 may be increased.

The plurality of transparent thin plates 30A to 30C may be fixed in a laminated state to increase handleability. The plurality of transparent thin plates 30A to 30C may be fixed by welding (including ultrasonic welding), adhering, pressure bonding, or fixing with a frame. The image displayed on the display section 110 of the portable terminal 100 illustrated in FIG. 6 may be a still image or may be a moving image. For example, on the display section 110, a moving image 120B of which display position, shape, color, and the like change with time is displayed as projection mapping on the background stereoscopic object 20 together with a still image 120A of the same color and outline as those of a front image of the stereoscopic object 20. In this manner, by superimposing the still image of the stereoscopic object viewed through the transparent plate 30 on the image of the display section 110 including the moving image, variously created pseudo images, such as 3D hologram, (for example, an image in which the stereoscopic object is moving) may be reproduced at the front opening 16 of the image display device illustrated in FIG. 7.

As illustrated in FIG. 7, a viewing angle at the front opening 16 of the image display device is limited by the side edge walls 14A and 14B. Therefore, even if the display section 110 of the portable terminal 100 is a liquid crystal display section or the like, the viewing angle at the front opening 16 of the display device may be adapted to a viewing angle of the liquid crystal display section. Since the field of view at the front opening 16 of the image display device is limited by the side edge walls 14A and 14B and the lower edge wall 14C, unnecessary backgrounds of the bottom wall 11, side walls 13 and 13, and the like of the box body 10 may be hidden.

In the present embodiment, since the portable terminal 100 is supported from the display section 110 side, the transparent plate 30 is situated below the display section 110 of the supported portable terminal 100. Then, unless the user lifts the image display device above the eye line and tries to view inside the front opening 16 from below (viewing from below is not a normal usage situation because the space behind the transparent plate 30 (i.e., the rear side: the space on the opposite side of the user with respect to the transparent plate 30) is not easily viewed from the front opening 16), the display on the display section 110 of the portable terminal 100 is not easily viewed by the user. Therefore, a situation in which the user views both the image display on the transparent plate 30 and the display section 110 of the portable terminal 100 and loses interest may be reduced.

In order to superimpose the image of the display section 110 of the portable terminal 100 on the stereoscopic object 20 and to align the portable terminal 100 with the box body 10, a marker may be provided in the box body 10, the stereoscopic object 20, or the display section 110. A marker 23 is provided at, for example, the center in the width direction on the upper surface of the stereoscopic object 20 in FIGS. 1 to 3. A centerline of the display section 110 of the portable terminal 100 may be aligned with the marker 23.

Figure 9:
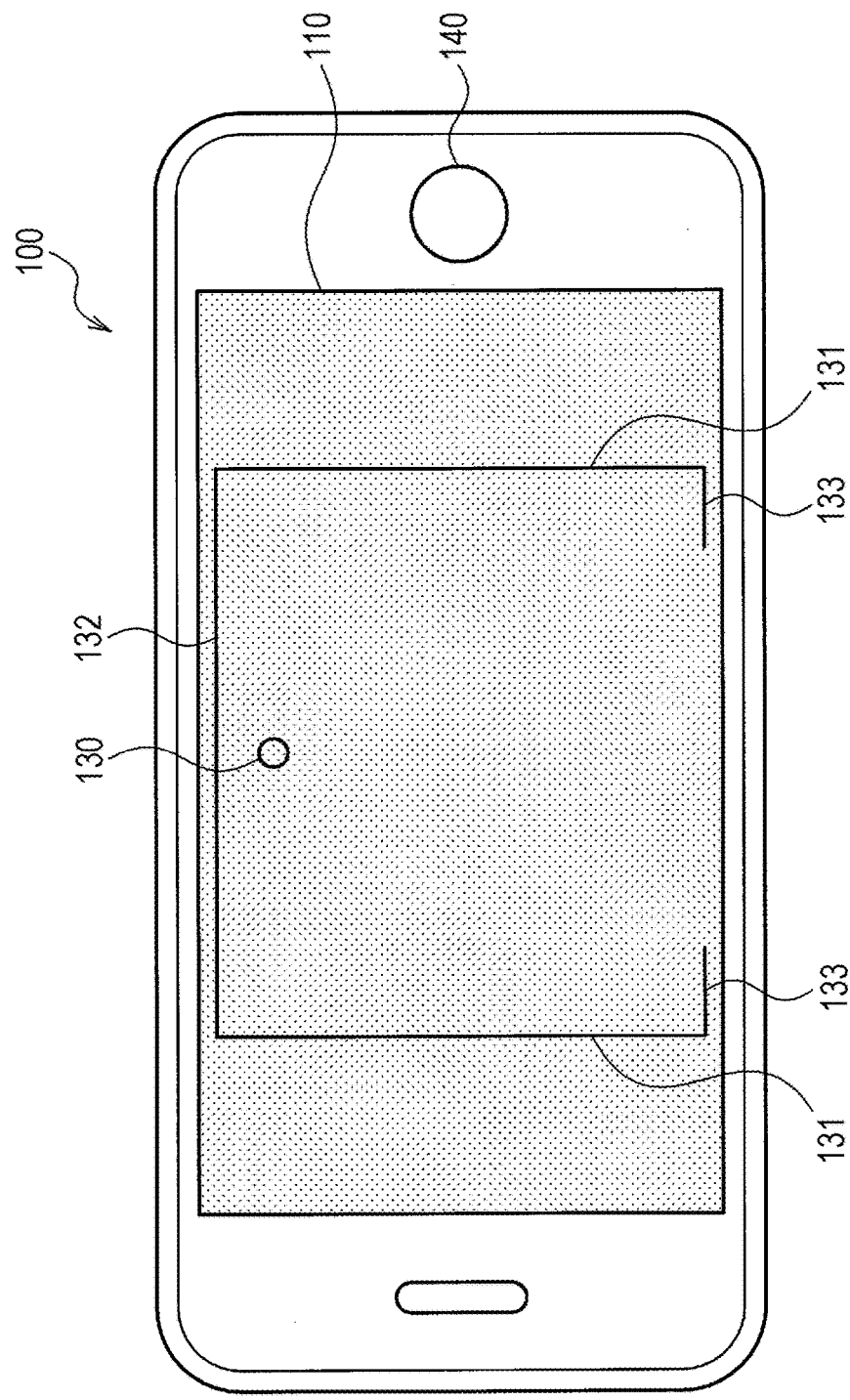
FIG. 9 is a diagram illustrating a marker displayed on the display section of the portable terminal.

FIG. 9 illustrates markers 130 to 133 displayed on the display section 110 of the portable terminal 100. The marker 130 may be displayed at a position corresponding to the marker 23 provided in the stereoscopic object 20. The marker 131 is aligned with the side walls 13 and 13 of the box body 10. The marker 132 is aligned with the rear wall 12 of the box body 10. The marker 133 is aligned with the side edge walls 14A and 14B of the box body 10. The display section 110 may display one or more of markers 130 to 133.

Figure 10:
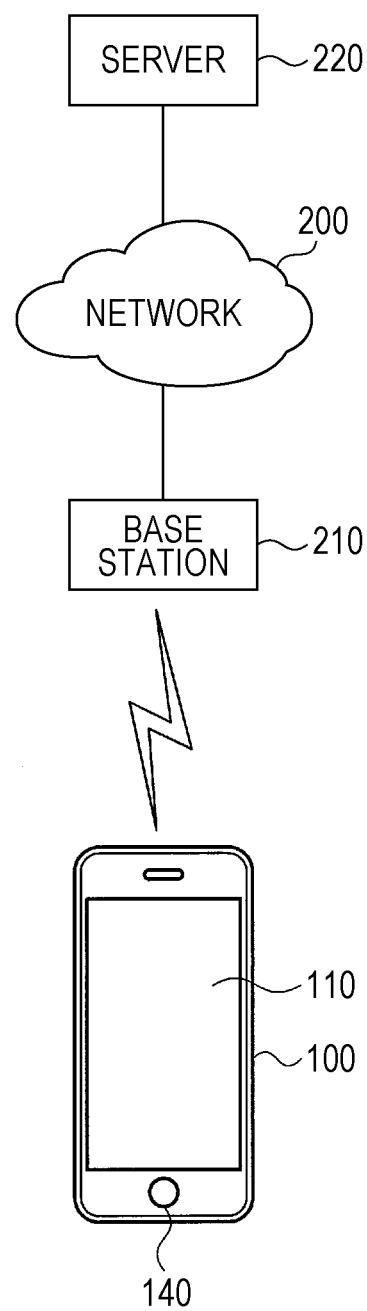
FIG. 10 is a diagram illustrating a network to which a base station communicating with the portable terminal and a server are connected.
Figure 11:
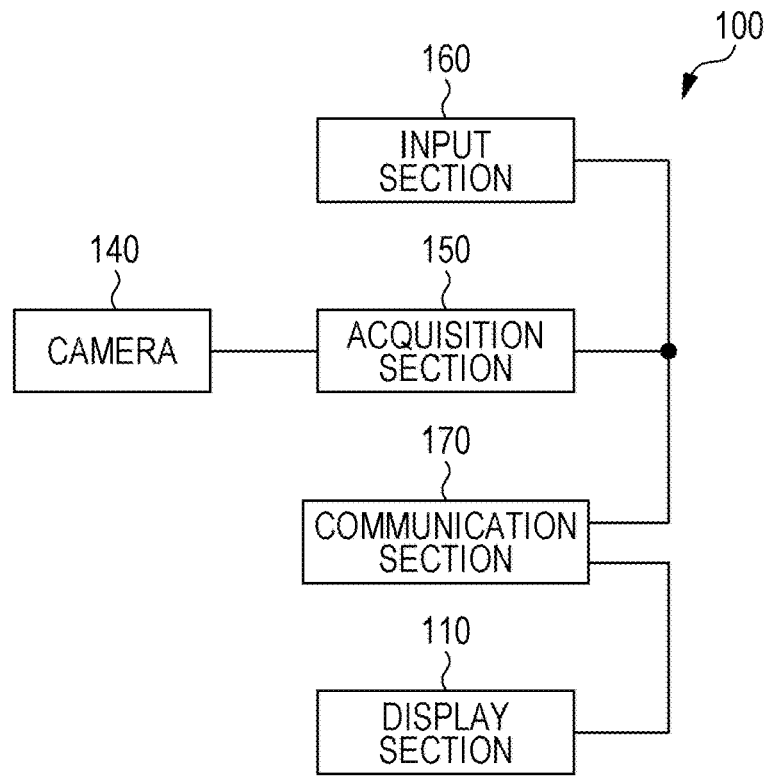
FIG. 11 is a functional block diagram of the portable terminal.

As illustrated in FIG. 10, a base station 210 which communicates with the portable terminal 100 is connected to a server 220 via a network 200. As illustrated in FIG. 11, the portable terminal 100 includes an acquisition section 150 connected to a camera 140 illustrated in FIG. 9 other than the display section 110. The camera 140 of the portable terminal 100 reads QR code (registered trademark) 17 which is a 2D code provided in the box body 10 as illustrated in FIG. 1, and the read code information is acquired by the acquisition section 150. The portable terminal 100 further includes an input section 160 for inputting an icon or the like to be displayed on the display section 110, and a communication section 170. The communication section 170 communicates with the server 220 using a URL included in the QR code (registered trademark) 17, which is access information of the server 220.

Figure 12:
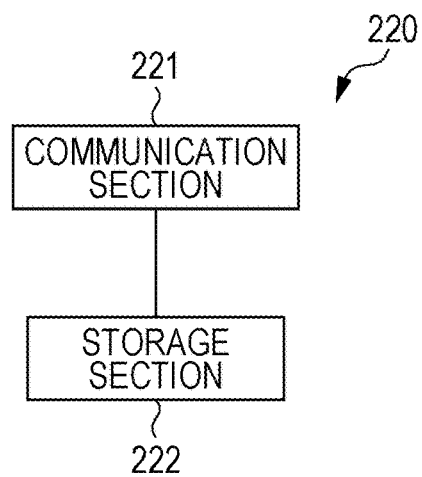
FIG. 12 is a functional block diagram of the server.

The server 220 includes a communication section 221 and a storage section 222 as illustrated in FIG. 12. The server 220 executes the following Procedures 1 and 2 in accordance with a program stored in the storage section 222 to the portable terminal 100 accessed on the basis of the QR code (registered trademark) 17. As Procedure 1, the server 220 reads data of an image of at least one marker among the markers 130 to 133 illustrated in FIG. 9 from the storage section 222 and transmits the data to the portable terminal 100 via the communication section 221, the network 200, and the base station 210. As Procedure 2, the server 220 reads data of the images 120A and 120B illustrated in FIG. 6 from the storage section 222 and transmits the data to the portable terminal 100 via the communication section 221, the network 200, and the base station 210.

The server 220 may let the image of the marker of Procedure 1 be displayed on the display section 110 of the portable terminal 100 for a predetermined initial time and then proceed to Procedure 2. That is, after the portable terminal 100 is aligned using the markers 130 to 133 displayed by Procedure 1, the markers 130 to 133 are not displayed. Alternatively, the server 220 may let the image of the marker of Procedure 1 be displayed on the display section 110 of the portable terminal 100 for a predetermined initial time and then execute Procedures 1 and 2 in parallel. That is, the image of the marker may be displayed as an initial image, or continuously displayed with the images 120A and 120B illustrated in FIG. 6.

The form of the present invention is not limited to the embodiment described above and components may be added, excluded, or modified suitably.

Figure 13:
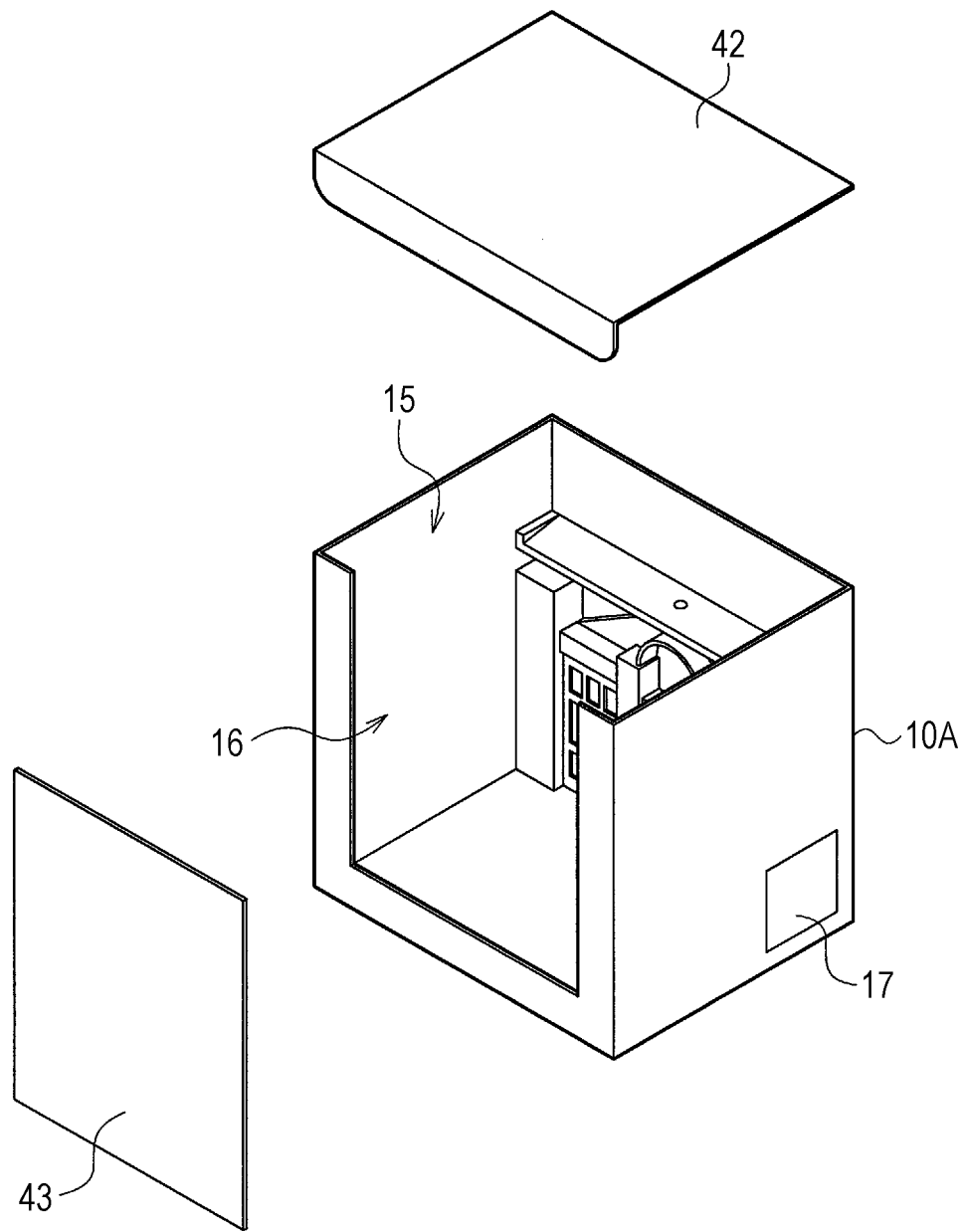
FIG. 13 is a perspective view illustrating a modification of a packaging container in which a box body and a lid body are integrated with each other in a separable manner.

For example, the box body 10 and the lid body 40 are not necessarily provided separately as illustrated in FIG. 1. A box body 10A illustrated in FIG. 13 may integrally include a first lid body 42 which covers an upper opening 15 and a second lid body 43 which covers a front opening 16. The first lid body 42 and the second lid body 43 are connected to the box body 10A via, for example, perforation lines and are separated from the box body 10A at the time of use.

Figure 14:
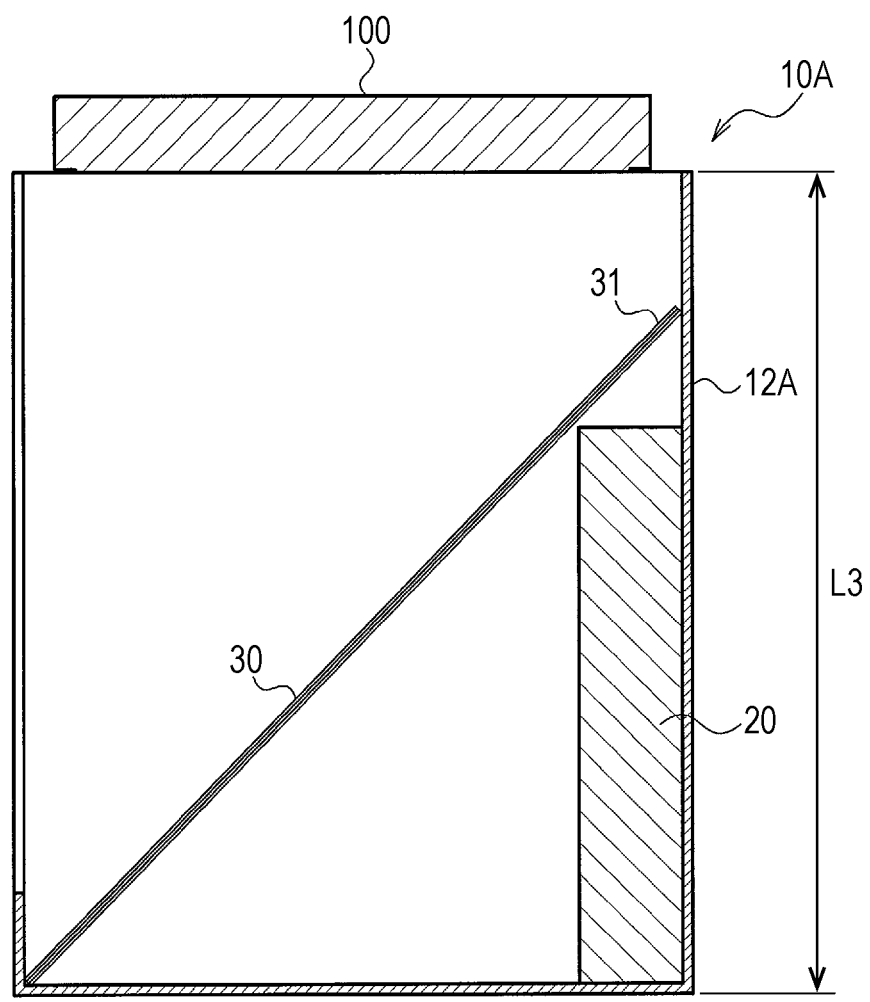
FIG. 14 is a cross-sectional view illustrating an image display device using the box body illustrated in FIG. 13.

As illustrated in FIG. 14, since the box body 10A has a height L3 that is the same as the height L3 of the lid body 40 illustrated in FIG. 1, the transparent plate 30 having the length L2 (see FIG. 1) may be contained at a vertical position in the box body 10A. As illustrated in FIG. 14, a placement section for placing the upper end portion 31 of the transparent plate 30 may also be provided on a rear wall 12A of the box body 10A instead of the stereoscopic object 20.

What is claimed is:

1. An image display device, comprising:
   an object;
   a supporting body that supports a portable terminal having a display section in such a manner that the display section faces down, the supporting body including an information area having information corresponding to an image that is to be displayed by the portable terminal, a portion of an outline of the front side of the object corresponding to a portion of an outline of the image displayed on the display section; and
   a transparent plate disposed at the front side of the object in an inclined manner such that an upper end thereof is located closer to the object relative to a lower end thereof, the transparent plate reflecting the image such that a reflected image is overlapped with the object that is seen through the transparent plate.

2. The image display device according to claim 1, wherein the information includes access information for the portable terminal to access a server that has the image to be displayed by the portable terminal.

3. The image display device according to claim 1, wherein the information includes a matrix barcode.

4. A image display system, comprising:
   the image display device according to claim 1; and
   a server configured to provide the image to be displayed by the portable terminal, wherein
   the information includes access information for accessing the server, and
   the portable terminal obtains the image from the server using the access information.

5. An image display system, comprising
   a terminal display including a display section that display an image; and
   an image display device that includes:
      an object;
      a supporting body that supports the terminal display in such a manner that the display section faces down, the display section displaying the image at a front side of the object, a portion of an outline of the front side of the object corresponding to a portion of an outline of the image displayed on the display section, the supporting body including an information area having information corresponding to an image that is to be displayed by the terminal display; and
      a transparent plate disposed at the front side of the object in an inclined manner such that an upper end thereof is located closer to the object relative to a lower end thereof, the transparent plate reflecting the image such that a reflected image is overlapped with the object that is seen through the transparent plate.

6. The image display system according to claim 5, wherein the information includes access information for the terminal display to access a server that has the image to be displayed by the terminal display.

7. The image display system according to claim 5, wherein the information includes a matrix barcode.

8. The image display system according to claim 5, further comprising a server configured to provide the image to the terminal display, wherein the information includes access information for accessing the server, and the terminal display obtains the image from the server using the access information.

9. An image display device, comprising:
an object including
- a placement section and
- two side stoppers that protrude upwardly from respective ends of the placement section in a width direction thereof;

a supporting body that supports a portable terminal having a display section in such a manner that the display section faces down, the display section displaying an image at a front side of the object, a portion of an outline of the front side of the object corresponding to a portion of an outline of the image displayed on the display section;

a transparent plate disposed at the front side of the object in an inclined manner such that an upper end thereof is located closer to the object relative to a lower end thereof, the transparent plate reflecting the image such that a reflected image is overlapped with the object that is seen through the transparent plate, the placement section of the object defining an angle of the transparent plate and determining a position of the transparent plate in the width direction; and a box body including
- a bottom wall on which the object is placed,
- a rear wall disposed at a rear side of the object,
- first and second side walls respectively disposed at opposing sides of the rear wall so as to support the portable terminal together with the rear wall,
- an upper opening disposed at a position opposite to the bottom wall, and a front opening disposed at a position opposite to the rear wall.

\* \* \* \* \*